Oct. 26, 1937.                L. H. SPRINKLE                2,097,047
            ARTIFICIAL TOOTH AND MEANS FOR CONNECTING
              THE SAME TO DENTAL PLATES OR DENTURES
                       Filed March 5, 1936
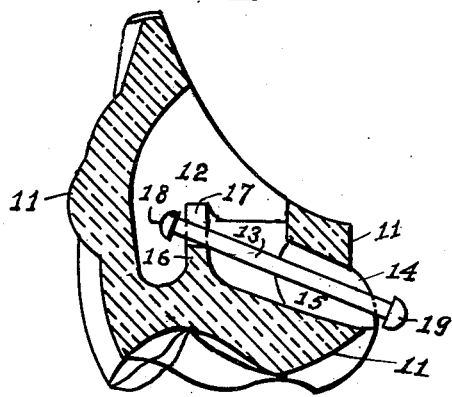
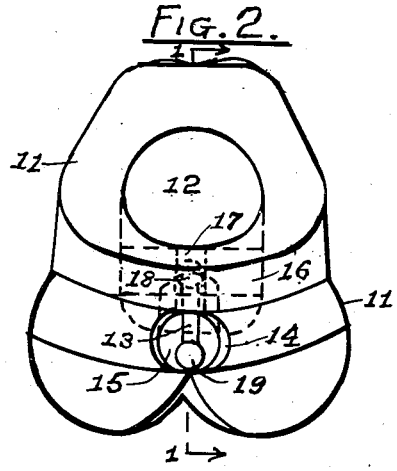
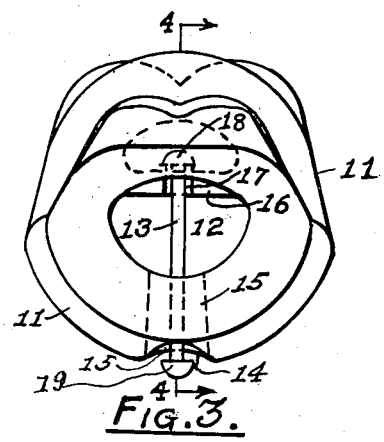
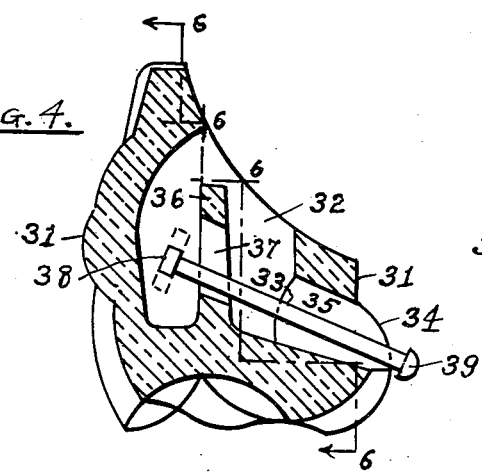
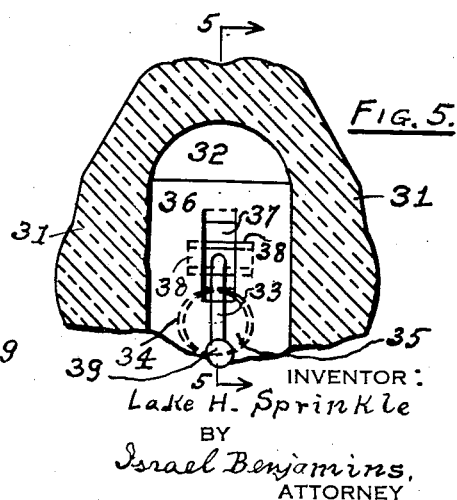
INVENTOR:
Lake H. Sprinkle
BY
Israel Benjamins,
ATTORNEY Patented Oct. 26, 1937

2,097,047

UNITED STATES PATENT OFFICE 2,097,047

ARTIFICIAL TOOTH AND MEANS FOR CONNECTING THE SAME TO DENTAL PLATES OR DENTURES

Lake H. Sprinkle, Brooklyn, N. Y., assignor to Isabella Bayne Young, Brooklyn, N. Y.

Application March 5, 1936, Serial No. 67,289

4 Claims. (Cl. 32—10)

My invention relates to improvements in artificial teeth and means for connecting the same to dental plates or dentures and it consists in the novel features, which are hereinafter described.

One of the objects of my invention is to eliminate precious metals such as platinum for anchoring pins in artificial teeth, thereby reducing the cost of teeth and dentures.

Another object of my invention is to avoid oxidation of base metal pins in artificial teeth by the heat of the furnace.

A further object of my invention is to enable one to connect anchoring pins to artificial teeth after the latter have been baked, thereby reducing labor.

A still other object of my invention is to increase the strength of the connections of artificial teeth to dental plates or dentures.

Another object of my invention is to increase the length of the part of an anchoring pin of an artificial tooth which extends into the rubber or other material of a plate or denture.

A further object of my invention is to facilitate the grinding of artificial teeth and to prevent the collapsing of the sides of artificial teeth which may be caused by lateral openings in artificial teeth of standard construction.

A still other object is to have my artificial teeth and the means for connecting the same to dental plates or dentures simple, durable and inexpensive.

Other objects and advantages will hereinafter appear.

I attain these objects by the artificial teeth and the means for connecting the same to dental plates or dentures, three forms of which are illustrated in the accompanying drawing, or by any mechanical equivalent or obvious modification of the same.

In the drawing Fig. 1 is a vertical section on the line 1—1 of Fig. 2, looking in the direction of the arrows, showing one form of my invention; Fig. 2 is a rear elevation of the tooth and connecting means which are shown in Fig. 1, looking from right to left in Fig. 1; and Fig. 3 is a plan view of the tooth and the connecting means thereof which are shown in Figs. 1 and 2.

Fig. 4 is a vertical section of a still other form of my artificial tooth and the connecting means thereof; and Fig. 5 is a fragmentary section on the lines 6—6—6— of Fig. 5, looking in the direction of the arrows.

Similar numerals refer to similar parts throughout the several views:

In the form of my invention which is shown in Figs. 1, 2 and 3, 11 designates the body of an artificial tooth which has been baked in the furnace and has therein a substantially vertically disposed cavity 12.

A double headed pin 13, which may be of steel or some other inexpensive metal, is shown as disposed to be connected to the body 11 of the tooth, after the latter has been baked in the furnace, and to the plate of a denture.

To pass the inner end of the pin 13 into the cavity 12, I provide in the lingual side of the tooth an opening 14 and a passage 15 which extends therefrom to the cavity 12 and is disposed transversely to the latter.

An inner wall or partition 16 is shown as extending upwardly from the part of the body 11 at the bottom of the cavity 12 and is shown as provided at the upper end thereof with a slot or passage 17, which is open at the upper end thereof, for lowering thereinto the inner end of the pin 13; the head 18 at said inner end is wider than the slot 17 and is anchored thereby in position in abutment with the parts of the wall 16 which are adjacent to said slot 17 inwardly of the latter.

The pin 13 terminates at the outer end thereof in a head 19, which is to extend into the rubber or other material of a plate or denture when the body 11 is connected to the latter.

In the form of my invention which is shown in Figs. 4 and 5, a wall or partition 36 is shown as extending from the part of the body 31 of a tooth at the bottom of the cavity 32 in the said body; the wall 36 is shown as provided with a substantially rectangular opening 37 which is shown as disposed with its longer sides substantially vertical and with its shorter sides substantially horizontal.

The pin 33 is to be connected to the body 31 after the latter has been baked, and has at the inner end thereof an oblong head 38, which may be passed through the said opening 37 with the longer side thereof parallel to the said opening 37 when introducing the inner end of the pin 33 into the said cavity 32, as shown in dotted lines in Fig. 4; the pin 33 may then be turned through an angle of about 90 degrees, whereby to bring the said head 38 into a position transversely to the said opening 37, thereby anchoring the said head 38 in position in the interior of the body 31 of the tooth.

The body 31 also has thereon on the lingual side thereof an opening 34 and a passage 35 for introducing therethrough the inner end of the pin 33 into the cavity 32.

The passage 15 of Figs. 1, 2 and 3 and the passage 35 of Figs. 4 and 5 also serve for the escape of steam therethrough during the process of connecting the teeth to the rubber or other material of a plate or denture.

Variations are possible, and parts of my invention may be used without other parts; I do not, therefore, restrict myself to the details as shown in the drawing.

I claim as my invention and desire to secure by Letters Patent:

1. The combination of an artificial tooth, comprising a body, which has been baked in a furnace, and a pin of an inexpensive metal, said body having therein a cavity at the middle part thereof, an inner wall in said cavity spaced from the tooth body and a passage through the lingual side of said body and through said wall, wherethrough to introduce one end of said pin into the inner part of said cavity, and a head on the pin at said end thereof, for engaging thereby a part of said wall, the other end of said pin extending outwardly from said passage for connecting the same to the material of a denture.

2. An artificial tooth comprising a body which has been baked in a furnace and has therein a cavity at the middle part thereof, an inner wall in said cavity spaced from the tooth body, a passage through the lingual side of said body and through said wall, communicating with the inner part of said cavity, and a face on said wall for engaging thereby the head at the inner end of a pin, which may be introduced into the said inner part through said passage, whereby said body may have said pin connected thereto after said body has been baked in a furnace.

3. An artificial tooth comprising a body which has been baked in a furnace and has therein at the middle part thereof a cavity and, spaced from the tooth body, an inner wall with a slot therein which is open at the upper end thereof whereby to engage the head of a pin, which head is wider than said slot, when said pin is lowered into the said slot through the upper end thereof, whereby said body may have said pin connected thereto after said body has been baked in the furnace.

4. The elements of claim 2, the passage through said wall being narrower and longer than said head, which is to be oblong in shape and is to be passed through said passage with its length parallel to the longer sides of said passage and thereupon to be turned substantially at right angles to its original position, whereby the said head may be engaged by the said face on said wall.

LAKE H. SPRINKLE.